(12) United States Patent
Firke et al.

(10) Patent No.: US 12,267,459 B2
(45) Date of Patent: *Apr. 1, 2025

(54) INTERACTIVE USER INTERFACE FOR PROFILE MANAGEMENT

(71) Applicant: eBay Inc., San Jose, CA (US)

(72) Inventors: Nikhil Firke, San Ramon, CA (US); Michael Chan, Cupertino, CA (US); Ralph Forsythe, San Jose, CA (US); Brian Peter Dickson, San Jose, CA (US); Todd Ryan Palmer, Livermore, CA (US)

(73) Assignee: eBay Inc., San Jose, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 17/706,849

(22) Filed: Mar. 29, 2022

(65) Prior Publication Data

US 2022/0224796 A1     Jul. 14, 2022

Related U.S. Application Data

(63) Continuation of application No. 17/141,613, filed on Jan. 5, 2021, which is a continuation of application
(Continued)

(51) Int. Cl.
*H04M 3/00*     (2024.01)
*G06Q 10/10*     (2023.01)
(Continued)

(52) U.S. Cl.
CPC .......... *H04M 3/5191* (2013.01); *G06Q 10/10* (2013.01); *G06Q 30/016* (2013.01);
(Continued)

(58) Field of Classification Search
CPC .......... H04M 3/5191; H04M 1/72403; H04M 3/5133; G06Q 10/10; G06Q 30/016; G06Q 30/02; H04L 67/306
(Continued)

(56) References Cited

U.S. PATENT DOCUMENTS 6,341,290 B1    1/2002   Lombardo et al.
7,054,906 B2    5/2006   Levosky
(Continued)

FOREIGN PATENT DOCUMENTS

KR    1020120065095     6/2012
KR    1020120066245     6/2012
(Continued)

OTHER PUBLICATIONS 201880004823.8 , "Foreign Office Action", CN Application No. 201880004823.8, Jun. 29, 2023, 7 pages.
(Continued)

*Primary Examiner* — William J Deane, Jr.
(74) *Attorney, Agent, or Firm* — FIG. 1 Patents

(57) ABSTRACT

Techniques for managing electronic user profiles are presented herein. An example method includes accessing, from a data structure, a user profile. The user profile can include a profile identifier and a plurality of data fields. The method also includes displaying, on a display device, an interactive user interface. The user interface can include a plurality of user interface action elements. Each of the user interface action elements can be associated with a data field in the data structure. Each of the user interface action elements can also be individually selectable by a respective user action to transmit the associated data field to a remote device. In response to receiving a selection of a user interface action element, the method can further include transmitting the associated data field and the profile identifier to a router
(Continued)

configured to send, based on the profile identifier, the associated data field to the remote device.

20 Claims, 9 Drawing Sheets

Related U.S. Application Data

No. 16/560,506, filed on Sep. 4, 2019, now Pat. No. 10,986,229, which is a continuation of application No. 15/402,899, filed on Jan. 10, 2017, now Pat. No. 10,462,298.

(51) Int. Cl.
  *G06Q 30/016* (2023.01)
  *G06Q 30/02* (2023.01)
  *H04L 67/306* (2022.01)
  *H04M 1/72403* (2021.01)
  *H04M 3/51* (2006.01)

(52) U.S. Cl.
  CPC ........... *G06Q 30/02* (2013.01); *H04L 67/306* (2013.01); *H04M 1/72403* (2021.01); *H04M 3/5133* (2013.01)

(58) Field of Classification Search
  USPC ....... 379/265.01–265.14, 266.01–266.1, 309
  See application file for complete search history.

(56) References Cited

U.S. PATENT DOCUMENTS

| | | | |
|---|---|---|---|
| 7,216,292 B1 | 5/2007 | Snapper et al. | |
| 8,374,334 B2 | 2/2013 | Sankaranarayanan | |
| 8,548,135 B1 | 10/2013 | Lavian et al. | |
| 8,664,817 B2 | 3/2014 | Rumbaugh et al. | |
| 8,873,735 B1 | 10/2014 | Brandwine et al. | |
| 8,943,124 B2 | 1/2015 | Massey et al. | |
| 9,020,845 B2 | 4/2015 | Marlowe et al. | |
| 9,223,496 B2 | 12/2015 | Howard et al. | |
| 9,794,603 B1 | 10/2017 | Nijim et al. | |
| 9,946,789 B1 | 4/2018 | Li | |
| 10,068,007 B1 | 9/2018 | Wohlsen | |
| 10,127,544 B2 | 11/2018 | Mcelmurry et al. | |
| 10,462,298 B2 | 10/2019 | Firke et al. | |
| 10,986,221 B2 | 4/2021 | Cohen | |
| 10,986,229 B2 | 4/2021 | Firke et al. | |
| 2002/0049701 A1 | 4/2002 | Nabe et al. | |
| 2003/0179913 A1 | 9/2003 | Murase et al. | |
| 2004/0041841 A1 | 3/2004 | Lemogne et al. | |
| 2005/0131815 A1 | 6/2005 | Fung et al. | |
| 2006/0059434 A1 | 3/2006 | Boss et al. | |
| 2008/0109429 A1 | 5/2008 | Petrin et al. | |
| 2009/0005014 A1 | 1/2009 | Vernick | |
| 2009/0243505 A1 | 10/2009 | Kimura | |
| 2010/0310171 A1 | 12/2010 | Miletzki | |
| 2010/0319043 A1 | 12/2010 | Jain et al. | |
| 2011/0066985 A1 | 3/2011 | Corbin et al. | |
| 2011/0251874 A1 | 10/2011 | Banthia et al. | |
| 2011/0251918 A1 | 10/2011 | Yarvis et al. | |
| 2011/0300832 A1 | 12/2011 | Shaw | |
| 2011/0314374 A1 | 12/2011 | Chae | |
| 2012/0158597 A1 | 5/2012 | Malik | |
| 2012/0185533 A1 | 7/2012 | Vuong | |
| 2013/0006789 A1 | 1/2013 | Fulkerson | |
| 2013/0048709 A1 | 2/2013 | Turner | |
| 2013/0073463 A1 | 3/2013 | Dimmick et al. | |
| 2013/0083063 A1 | 4/2013 | Geisner et al. | |
| 2013/0124229 A1 | 5/2013 | Cashman et al. | |
| 2013/0187850 A1* | 7/2013 | Schulz | G06F 1/1694 345/156 |
| 2013/0198684 A1 | 8/2013 | Boley et al. | |
| 2013/0254107 A1 | 9/2013 | Mcclure | |
| 2013/0303085 A1 | 11/2013 | Boucher et al. | |
| 2013/0325726 A1 | 12/2013 | Tuchman et al. | |
| 2014/0022934 A1 | 1/2014 | Furukawa et al. | |
| 2014/0032259 A1 | 1/2014 | Lafever et al. | |
| 2014/0050307 A1 | 2/2014 | Yuzefovich | |
| 2014/0222626 A1 | 8/2014 | Bhaktwatsalam et al. | |
| 2014/0223382 A1 | 8/2014 | Hicks et al. | |
| 2014/0229342 A1 | 8/2014 | Marlowe et al. | |
| 2014/0283135 A1 | 9/2014 | Shepherd et al. | |
| 2014/0287797 A1 | 9/2014 | Baek | |
| 2015/0039989 A1 | 2/2015 | Dhanawat et al. | |
| 2015/0161589 A1 | 6/2015 | Snider | |
| 2015/0302388 A1 | 10/2015 | Seidman et al. | |
| 2015/0332383 A1 | 11/2015 | Ragan et al. | |
| 2015/0379619 A1 | 12/2015 | Verde | |
| 2016/0035006 A1 | 2/2016 | Ragan et al. | |
| 2016/0117782 A1 | 4/2016 | Stibel et al. | |
| 2016/0155172 A1 | 6/2016 | Vernick | |
| 2016/0224217 A1 | 8/2016 | Kim et al. | |
| 2017/0083102 A1 | 3/2017 | Dow et al. | |
| 2017/0094482 A1* | 3/2017 | Arimilli | H04W 4/12 |
| 2017/0308794 A1 | 10/2017 | Fischerström | |
| 2017/0357627 A1* | 12/2017 | Peterson | G06F 7/023 |
| 2017/0372436 A1 | 12/2017 | Dalal et al. | |
| 2018/0011631 A1 | 1/2018 | Ballesteros et al. | |
| 2018/0014187 A1 | 1/2018 | Chan et al. | |
| 2018/0033027 A1 | 2/2018 | Ganesh et al. | |
| 2018/0120945 A1 | 5/2018 | Mason | |
| 2018/0124477 A1 | 5/2018 | Qu et al. | |
| 2018/0198914 A1 | 7/2018 | Firke et al. | |
| 2019/0014087 A1 | 1/2019 | Robinson et al. | |
| 2019/0082218 A1 | 3/2019 | Shaw et al. | |
| 2019/0215680 A1 | 7/2019 | Kim et al. | |
| 2019/0260851 A1 | 8/2019 | Agrawal et al. | |
| 2019/0391581 A1 | 12/2019 | Vardaro et al. | |
| 2019/0394334 A1 | 12/2019 | Firke et al. | |
| 2021/0127009 A1 | 4/2021 | Firke et al. | |
| 2021/0218779 A1* | 7/2021 | Wu | H04M 3/4211 |

FOREIGN PATENT DOCUMENTS

| | | |
|---|---|---|
| KR | 1020140139426 | 12/2014 |
| KR | 101565567 B1 | 11/2015 |
| KR | 1020160093471 | 8/2016 |
| WO | 2018132327 | 7/2018 |

OTHER PUBLICATIONS

U.S. Appl. No. 17/141,613, filed Dec. 23, 2022 , "Non-Final Office Action", U.S. Appl. No. 17/141,613, filed Dec. 23, 2022, 6 pages.
201880004823.8 , "Foreign Office Action", CN Application No. 201880004823.8, Nov. 18, 2022, 15 pages.
U.S. Appl. No. 17/141,613 , "Non-Final Office Action", U.S. Appl. No. 17/141,613, May 25, 2023, 7 pages.
201880004823.8 , "Foreign Office Action", CN Application No. 201880004823.8, Mar. 31, 2023, 8 pages.
U.S. Appl. No. 17/141,613, "Final Office Action", U.S. Appl. No. 17/141,613, Sep. 28, 2023, 8 pages.
201880004823.8 , "Notice of Allowance", CN Application No. 201880004823.8, Sep. 22, 2023, 4 pages.
"Bump—From Bump Technologies Here's How You Bump", Retrieved at: https://www.youtube.com/watch?v=niJguU7r-bs-on, Jul. 15, 2010, 2 pages.
"Final Office Action", U.S. Appl. No. 15/402,899, May 1, 2019, 8 pages.
"International Preliminary Report on Patentability", Application No. PCT/US2018/012750, Jul. 25, 2019, 8 pages.
"International Search Report and Written Opinion", Application No. PCT/US2018/012750, Apr. 16, 2018, 11 pages.
"Non-Final Office Action", U.S. Appl. No. 16/560,506, May 22, 2020, 6 pages.
"Non-Final Office Action", U.S. Appl. No. 15/402,899, Jun. 29, 2018, 5 pages.
"Non-Final Office Action", U.S. Appl. No. 15/402,899, Nov. 29, 2018, 7 pages.

(56) References Cited

OTHER PUBLICATIONS

"Non-Final Office Action", U.S. Appl. No. 16/560,506, Dec. 11, 2019, 4 pages.
"Notice of Allowance", U.S. Appl. No. 15/402,899, Jun. 18, 2019, 5 pages.
"Response to Final Office Action", U.S. Appl. No. 15/402,899, May 29, 2019, 19 pages.
"Response to Non-Final Office Action", U.S. Appl. No. 15/402,899, Jan. 7, 2019, 19 pages.
"Response to Non-Final Office Action", U.S. Appl. No. 15/402,899, Jul. 19, 2018, 28 pages.
"Supplemental Notice of Allowance", U.S. Appl. No. 15/402,899, Sep. 30, 2019, 2 pages.
"Why Visual IVR is a Bad Idea—Aspect Blogs", Retrieved at: http://blogs.aspect.com/why-visual-ivr-is-a-bad-idea, Mar. 30, 2015, 8 pages.
10-2019-7019900 , "Final Office Action received for Korean Patent Application No. 10-2019-7019900, mailed on Jun. 25, 2021", Jun. 25, 2021, 6 Pages.
10-2019-7019900 , "Final Office Action Received for Korean Patent Application No. 10-2019-7019900, mailed on Sep. 16, 2021", Sep. 16, 2021, 6 Pages.
10-2019-7019900 , "Office Action received for Korean Patent Application No. 10-2019-7019900 mailed on Dec. 21, 2020", Dec. 21, 2020, 8 Pages.
10-2021-7038074 , "Office Action Received for Korean Patent Application No. 10-2021-7038074, mailed on Dec. 17, 2021", Dec. 17, 2021, 8 Pages.
U.S. Appl. No. 16/560,506 , "Notice Of Allowance received for U.S. Appl. No. 16/560,506, mailed on Nov. 18, 2020", Nov. 18, 2020, 6 Pages.
U.S. Appl. No. 16/560,506 , "Response to Non-Final Office Action filed on Aug. 5, 2020 for U.S. Appl. No. 16/560,506, mailed on May 22, 2020", Aug. 5, 2020, 9 Pages.
U.S. Appl. No. 16/560,506 , "Response to Non-Final Office Action filed on Feb. 18, 2020 for U.S. Appl. No. 16/560,506, mailed on Dec. 11, 2019", Feb. 18, 2020, 12 Pages.
U.S. Appl. No. 16/560,506 , "Supplemental Notice of Allowability Received for U.S. Appl. No. 16/560,506, mailed on Mar. 24, 2021", Mar. 24, 2021, 2 Pages.
U.S. Appl. No. 17/141,613 , "Non Final Office Action received for U.S. Appl. No. 17/141,613, mailed on Oct. 5, 2021". Oct. 5, 2021, 6 Pages.
U.S. Appl. No. 17/141,613 , "Notice of Allowance Received for U.S. Appl. No. 17/141,613, mailed on Feb. 25, 2022", Feb. 25, 2022, 9 Pages.
18701973.2 , "Communication Pursuant To Article 94(3) EPC received for European Patent Application No. 18701973.2 mailed on Mar. 16, 2021", Mar. 16, 2021, 8 Pages.
10-2021-7038074 , "Notice Of Allowance received for Korean Patent Application No. 10-2021-7038074, mailed on Aug. 16, 2022", Aug. 16, 2022, 3 Pages.
U.S. Appl. No. 17/141,613 , "Non-Final Office Action", U.S. Appl. No. 17/141,613, Jul. 21, 2022, 7 pages.
MICROSOFT , "HoloLens", Nov. 2016, 12 pages.

\* cited by examiner

INTERACTIVE USER INTERFACE FOR PROFILE MANAGEMENT

CLAIM OF PRIORITY

This application is a continuation of and claims priority to U.S. patent application Ser. No. 17/141,613, filed Jan. 5, 2021, which is a continuation of and claims priority to U.S. patent application Ser. No. 16/560,506, filed Sep. 4, 2019, which is a continuation of and claims priority to U.S. patent application Ser. No. 15/402,899, filed Jan. 10, 2017. These disclosures are incorporated by reference herein in their entireties.

TECHNICAL FIELD

Embodiments of the present disclosure relate generally to messaging and graphical user interfaces and, more particularly, but not by way of limitation, to an interactive user interface for managing profiles on a mobile device.

BACKGROUND

Providing information to service providers and their customer service agents can be an arduous task and, due to the need to repeatedly look up and provide information, can be very time consuming. In conventional contexts, there are not efficient ways for communicating personal information to customer service agents. In such conventional contexts, a user or consumer places a voice call to a customer service agent and then provides the customer service agent with their name, address, unique identifier or some other personal information during the call. Providing this information is inefficient and challenging using traditional techniques. For example, callers communicating with menu-based voice recognition systems and customer service agents during voice calls may speak different languages, have varying accents, use different pronunciations, or have uncommon names. Additionally, a caller may not be able to efficiently provide information such as the spelling of their name, their address, account information, and other details during a call due to call quality issues. Current processes require that a caller provide information details by reading pieces of information, which is time consuming. The details provided tend to be generic and repetitive. Callers are often prompted to provide customer service agents with the same information repeatedly. Existing processes also lack a means for providing user or consumer information with a single operation or input.

The systems and methods described in the present disclosure attempt to provide solutions to the problems presented above.

DESCRIPTION OF EMBODIMENTS

Figure 1:
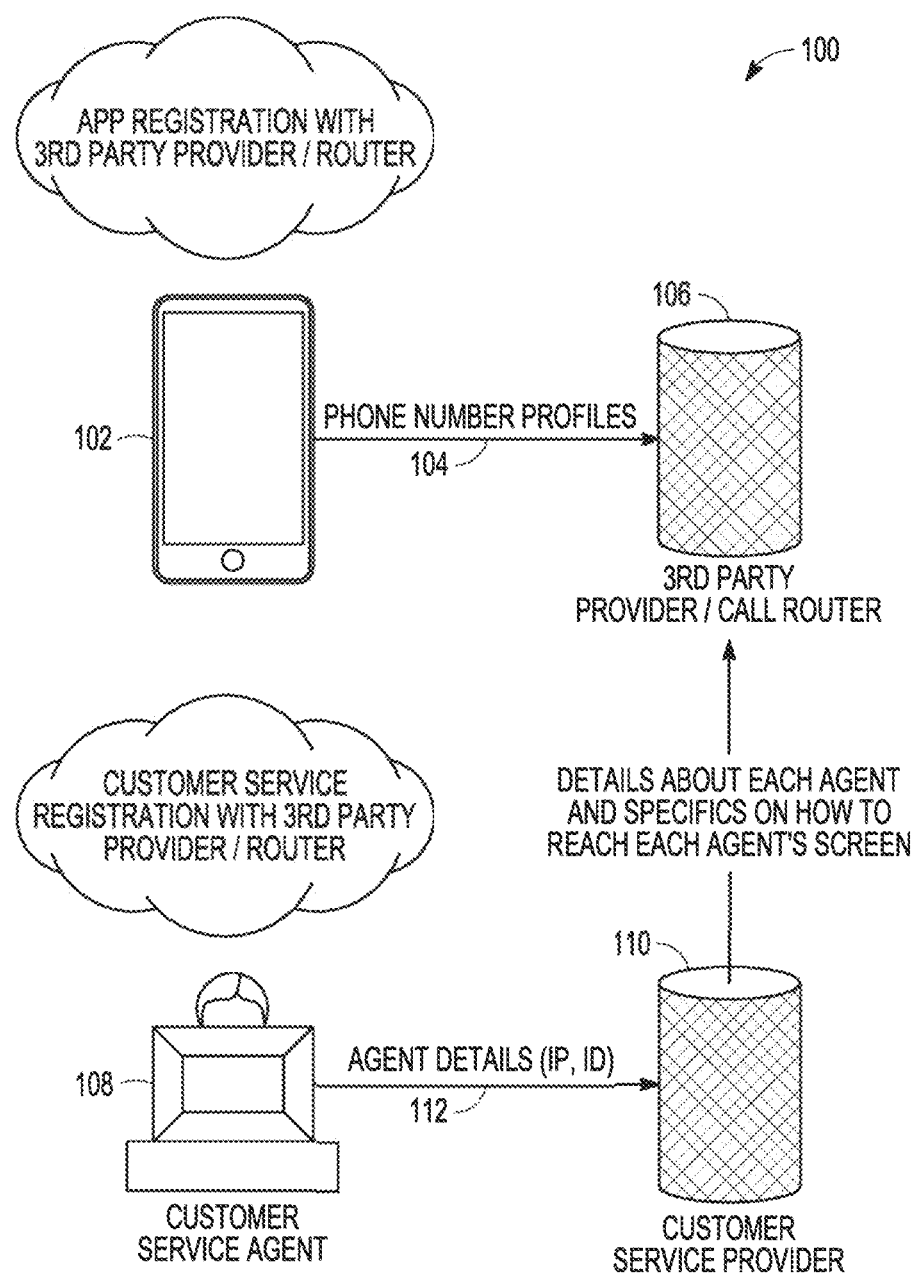
FIG. 1 is a flow diagram of a process for providing profile information to a customer service agent, in accordance with example embodiments.

The description that follows includes systems, methods, and techniques that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for efficient population, management, and communication of electronic profiles are provided herein. In some embodiments, a profile manager application maintains one or more user profiles locally on a mobile client device (e.g., a smartphone). In accordance with these embodiments, the profile manager application enables a user to selectively send data items from the one or more user profiles to a service provider so that the service provider's customer service agent(s) can access the data. The disclosed techniques overcome existing limitations between customer service agents and customers that occur due to unclear phone lines, language barriers, data entry mistakes, and certain routine details (e.g., contact information, mailing address, and account number) that can be generic and repetitive. Example embodiments include implementing a communications protocol that includes a simple layer of texted communication between a caller (e.g., a user or consumer) and a customer service agent. For instance, a profile management application can use Short Message Service (SMS) text messaging to send profile data to a customer service agent (via a third party router) during a call with the agent.

In some embodiments, a user installs an application on their client device that maintains a user profile for each service provider with which the user has an account. For example, a user may have a profile for a bank, a phone service provider, a healthcare provider, and an online shopping account. These profiles can be setup manually or populated automatically when the service provider sends a welcome email to the user. For instance, a welcome email can have a Quick Response (QR) code or key that allows the user to import a pre-built profile into their profile management application.

In various example embodiments, an interactive user interface having multiple operating modes for viewing, managing, and providing information included in electronic profiles is provided. Systems and methods disclosed herein enable efficient and clear communications between users and customer service agents. The systems provide an interactive user interface that enables a user to efficiently and accurately provide their information with a single input, such as, for example, a 'select and provide' touch, voice, or visual input. In some embodiments, the interactive user interface includes a plurality of user interface action elements, where each of the user interface action elements is associated with a data field in an electronic profile and individually selectable by a respective user action to transmit the associated data field to a remote device. In certain embodiments, the user interface action elements can be tagged by the customer service agent, with the tagging prompting a user to engage in the respective user action in order to send the data field to the customer service agent (e.g., a remote device being used by the agent). For example, messaging protocols can be used to communicate a customer service agent's need for certain profile data fields (e.g., a customer's name, contact information, address, or other profile information) to the user's mobile device. Upon receipt of a communication indicating the customer service agent's need for the profile data, the interactive user interface on the mobile device can prompt the user to send the needed data fields to the customer service agent.

In an embodiment, a user installs an application on a client device, such as, for example an app on a mobile device, that maintains the user's profiles for multiple service providers. For example, a user can have separate profiles for accounts with financial institutions such as banks, credit unions, and credit card issuers, accounts with government agencies such as a state department of motor vehicles (DMV), accounts with utilities, accounts with medical providers such as doctor's offices, dentists, and health insurance companies, accounts with communications providers such as wireless telecommunications service providers and internet service providers (ISPs), and account profiles for retailers and online shopping and e-commerce entities such as eBay and Amazon. In an additional or alternative embodiment, the user can also have a generic profile with the user's name, contact information, mailing address, and other profile data fields that may be relevant to multiple service providers.

Figure 3:
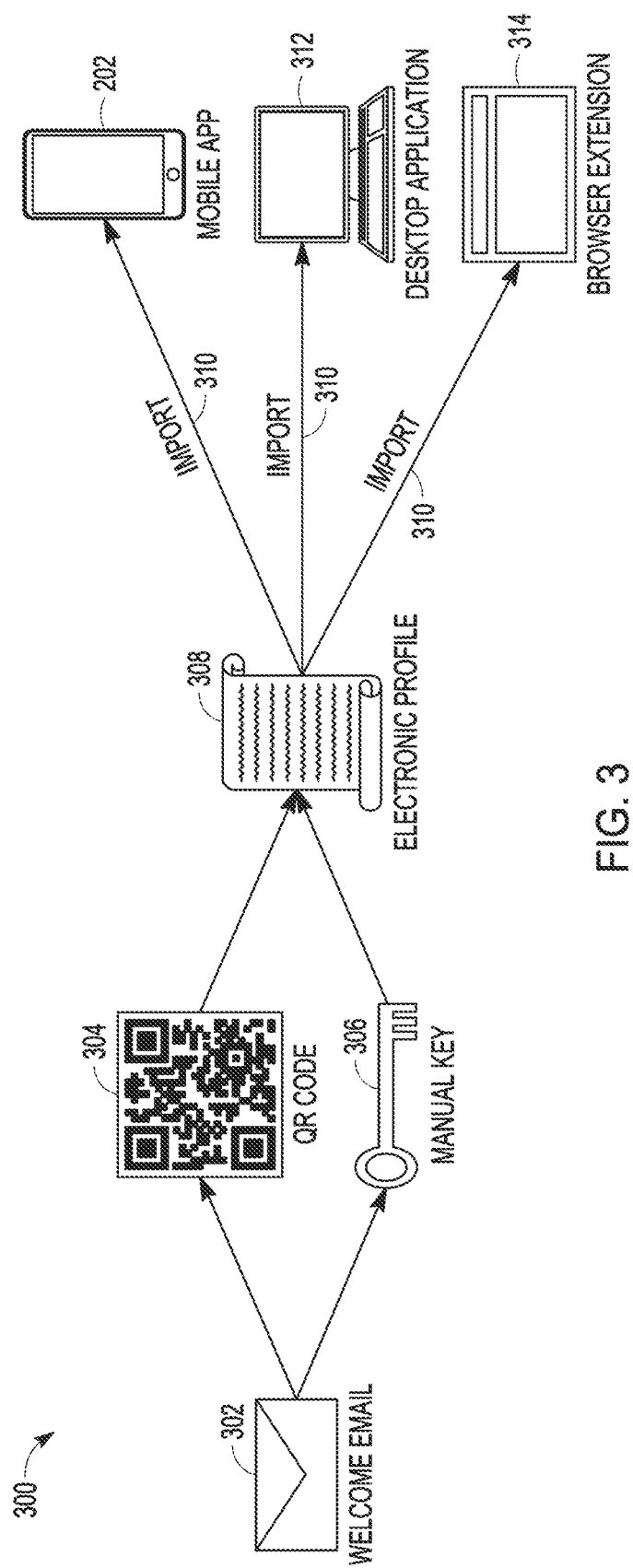
FIG. 3 is a block diagram illustrating an example system for automatically building an electronic profile, in accordance with example embodiments.
Figure 5:
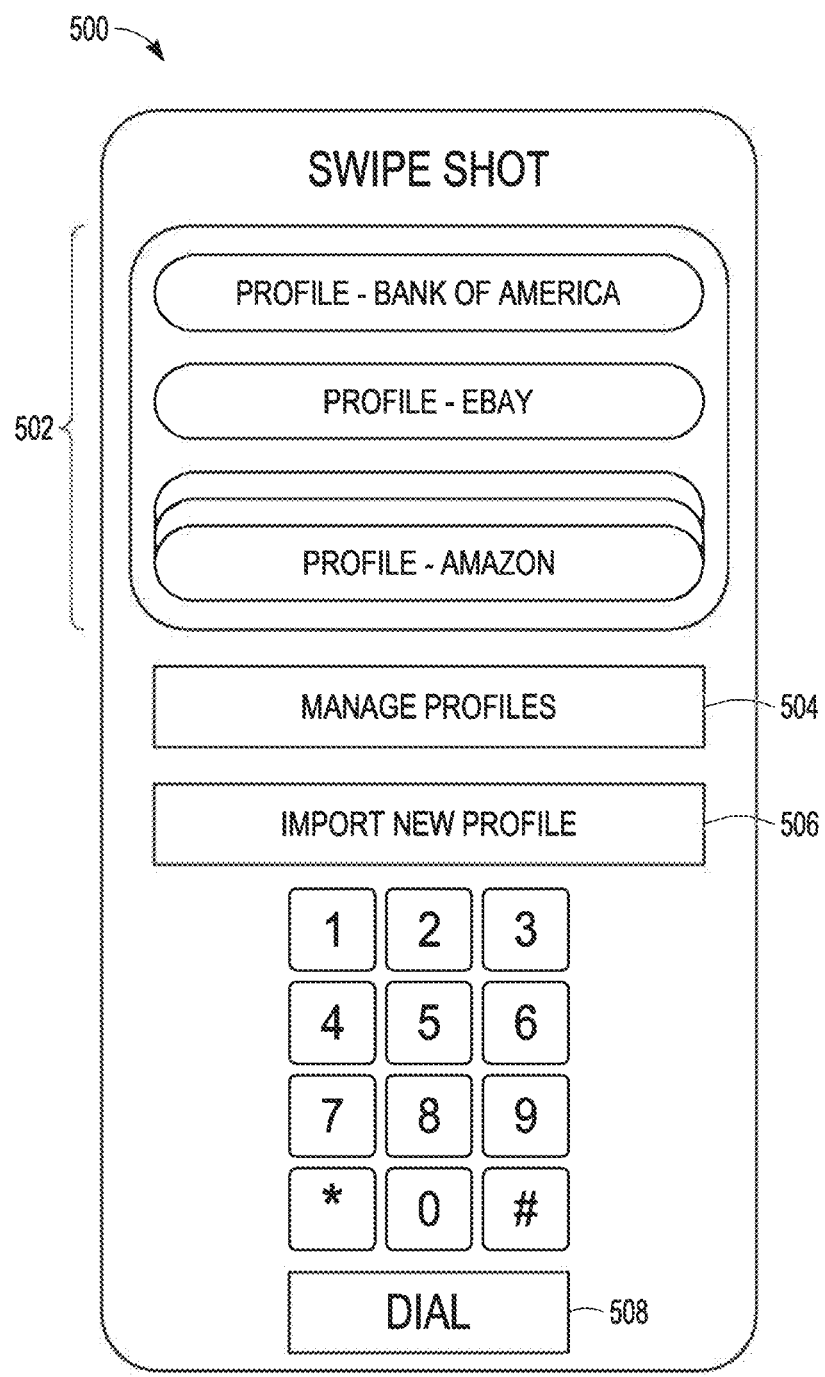
FIG. 5 illustrates an example interactive user interface for managing and importing electronic profiles, in accordance with example embodiments.
Figure 6:
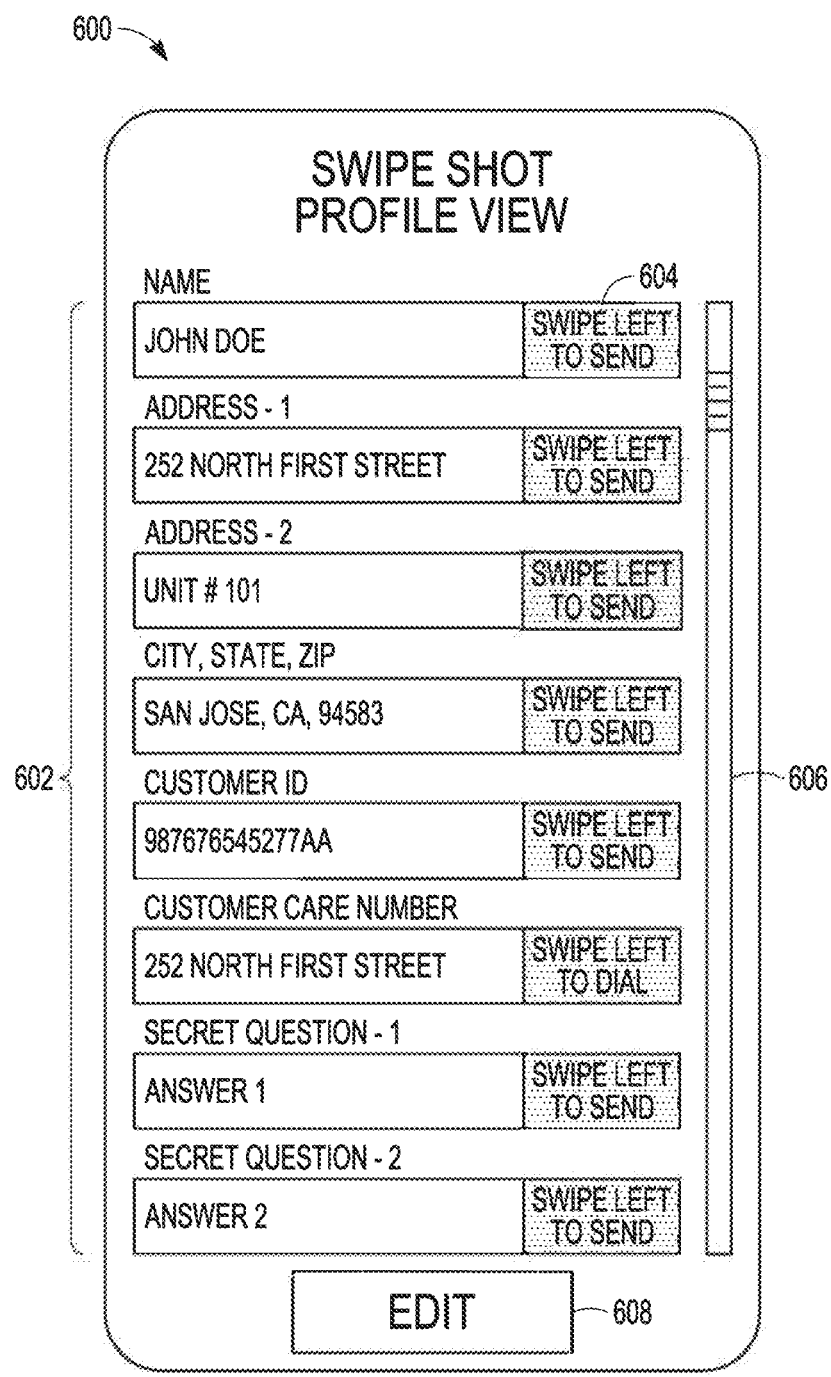
FIG. 6 illustrates an example interactive user interface for viewing and providing profile data, in accordance with example embodiments.

The application can include an interactive user interface that enables the user to populate and manage service provider profiles (see, e.g., the user interfaces shown in FIGS. 5 and 6). In certain embodiments, these profiles can be set up manually by the user. In additional or alternative embodiments, the profiles can be setup automatically when a service provider sends a welcome email to the user. For instance, as shown in the example of FIG. 3, a welcome email 302 can include a QR code 304 or manual key 306 that enables the user to automatically import a pre-built electronic profile 308 into the application. In any event, the profile data is stored locally on the user's client device (e.g., on the user's smartphone).

Example use cases of a profile management application are described in the following paragraphs.

In one example use case, when a user needs to connect with a service provider, the user launches a profile management app, which causes the app to render an interactive user interface. In certain embodiments, the application is a mobile app installed on a mobile device with voice, SMS text messaging, and data communication capabilities. For example, the mobile device can be a smartphone. The user can interact with the user interface to navigate to a particular service provider profile. The user can then select (e.g., click) on a call button included in the interface in order to place a call to a service provider. After the call is connected, an additional secured tunnel can be created between the app on the mobile device (e.g., the smartphone) and a customer service agent associated with the service provider. As the customer service agent attempts to collect information from the caller, the caller can interact with the interface (e.g., via a touch input such as a swipe, click, or tap on a particular field in their profile) in order to send corresponding information to the customer service agent. The information can be sent from the caller's mobile device and the customer service agent's computing device using a messaging or data communications protocol.

Additional example use cases can include using the profile management app to provide information for efficient form filling. For example, the app can be used to assist with populating forms when registering a new user, signing up for a service provider, or any time form filling with profile information (e.g., name, address, contact information) is required. Also, for example, the profile management app can be used wherever form filling is required, either by customer service agents or by consumers. According to these examples, the app can be used to provide information to a service provider's or merchant's customer service department when a caller is prompted to furnish the information via a menu-based voice recognition system. In another example use case, the app can be used to provide information to a customer service agent that is required to identify or authenticate a caller. Additionally, the app can be used to provide profile information when a caller is opening a new account with a service provider via a phone call. For instance, the app can be used to perform more efficient form filling that is needed when a new account is being created by the service provider's customer service agent while the agent is on a call with a new customer.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 1 is a flow diagram illustrating an example process 100 for providing profile information to a customer service agent 108. As depicted in FIG. 1, the process 100 can include registering an app on a mobile device 102. The app can be installed by a user of the mobile device 102 and then app is registered with a third party provider 106. As shown, the app registration can include sending profiles 104 from the mobile device 102 to the third party provider 106. In some embodiments, a profile 104 for each customer service phone number can be transmitted from the mobile device 102 to the third party provider 106.

As shown in FIG. 1, the third party provider 106 can function as a call router that routes communications (e.g., voice calls, data, SMS messages, video calls) from the mobile device 102 to a customer service agent 108 of a customer service provider 110. In some embodiments, the process 100 includes establishing a secure channel between the third party provider 106 and the customer service provider 110. In the example embodiment of FIG. 1, the third party provider 106 receives profiles 104 from the mobile device 102, and also receives customer service registration information from the customer service agent 108 via the customer service provider 110. The profiles 104 can include a contact phone number and other populated data fields that are sent from the mobile device 102.

Selected data fields from a profile 104 can be sent in response to user interaction with corresponding user interface action elements presented in an interactive user interface on the mobile device 102. For instance, the profiles 104 can include a phone number associated with the mobile device 102, a customer identifier (customer ID), and populated data fields from a data structure. The customer ID can be used to uniquely identify a customer. In certain embodiments, the data fields can include one or more of a customer name, an address (e.g., a billing address, a shipping address, or another address associated with the customer), a customer care number, and authentication information. The authentication information can include a login name, password, and the answers to one or more security questions.

As illustrated in FIG. 1, the third party provider 106 does not store user data from the profile 104. Instead, the third party provider 106 acts as a router to transfer selected data fields from the profile 104 to the customer service agent 108. For example, when a user of the mobile device 102 selects a populated data field from a profile 104 by selecting a corresponding user interface action element, the data field value is transmitted to the customer service agent 108 (e.g., a screen of a device used by the customer service agent 108 to connect to the customer service provider 110).

As depicted in FIG. 1, the process 100 also includes registration of the customer service agent 108 with the third party provider 106. The customer service agent 108 registers with the third party provider 106 by sending agent details 112 to the customer service provider 110, which then forwards the details to the third party provider 106. In the example of FIG. 1, the agent details 112 can include an Internet Protocol (IP) address associated with the customer service agent 108 (e.g., the IP address for the agent's computing device) and an agent identifier (e.g., a unique agent ID). The customer service provider 110 forwards these agent details along with information specifying how to reach the agent (e.g., contact information) to the third party provider 106. In certain embodiments, the information specifying how to reach the customer service agent 108 can include information needed to communicate with the agent such as, for example, an email address or a phone number.

After the customer service registration has been completed, the third party provider 106 can then function as a router to transfer selected fields from a user's profile 104 to the customer service agent 108. For example, during an ongoing call with a registered customer service agent 108 of a customer service provider 110, a user of the mobile device 102 can select one or more populated data fields from the user's profile 104 by interacting with corresponding user interface action elements. In accordance with embodiments, the user selections can include inputs received at the mobile device 102. For instance, a user of the mobile device 102 can select individual user interface action elements by providing touch, voice, or visual inputs via an interactive user interface displayed by the mobile device 102.

In some embodiments, interactions for selecting fields of the profile 104 can include touch inputs such as swiping, tapping, clicking, or pressing user interface action elements corresponding to the profile fields. In additional or alternative embodiments, the interactions can include gestures, voice commands, and visual inputs detected by a sensor (e.g., a microphone, camera, or accelerometer) of the mobile device 102. In certain embodiments, the mobile device 102 can include a virtual reality (VR) headset having one or more of: a stereoscopic head-mounted display that provides separate images for each eye; audio input/output (I/O) devices that provide stereo sound and receive voice inputs; touchpads, buttons, and head motion tracking sensors; eye tracking sensors; motion tracked handheld controllers; and gaming controllers usable to interact with and select fields of the user's profile 104. For instance, a user of the mobile device 102 who is wearing a VR headset can select fields of the profile 104 via visual inputs. Examples of visual inputs include inputs captured via head motion tracking sensors and eye tracking sensors of the VR headset. In additional or alternative embodiments, a user of the mobile device 102 can use one or more of a touch pad, keyboard, pointing device (e.g., a mouse, finger, stylus, or gaming controller), or buttons to select fields of the profile 104 that the user wishes to send to the customer service agent 108.

In response to detecting selections of data fields of the user's profile 104, the data field values are transmitted to the customer service agent 108. The selections trigger transmission of the associated data fields from the user's profile 104 to the third party provider 106. After receiving the data fields, the third party provider 106 then uses the information specifying how to reach the customer service agent 108 to forward the data fields to the agent via the customer service provider 110.

Figure 2:
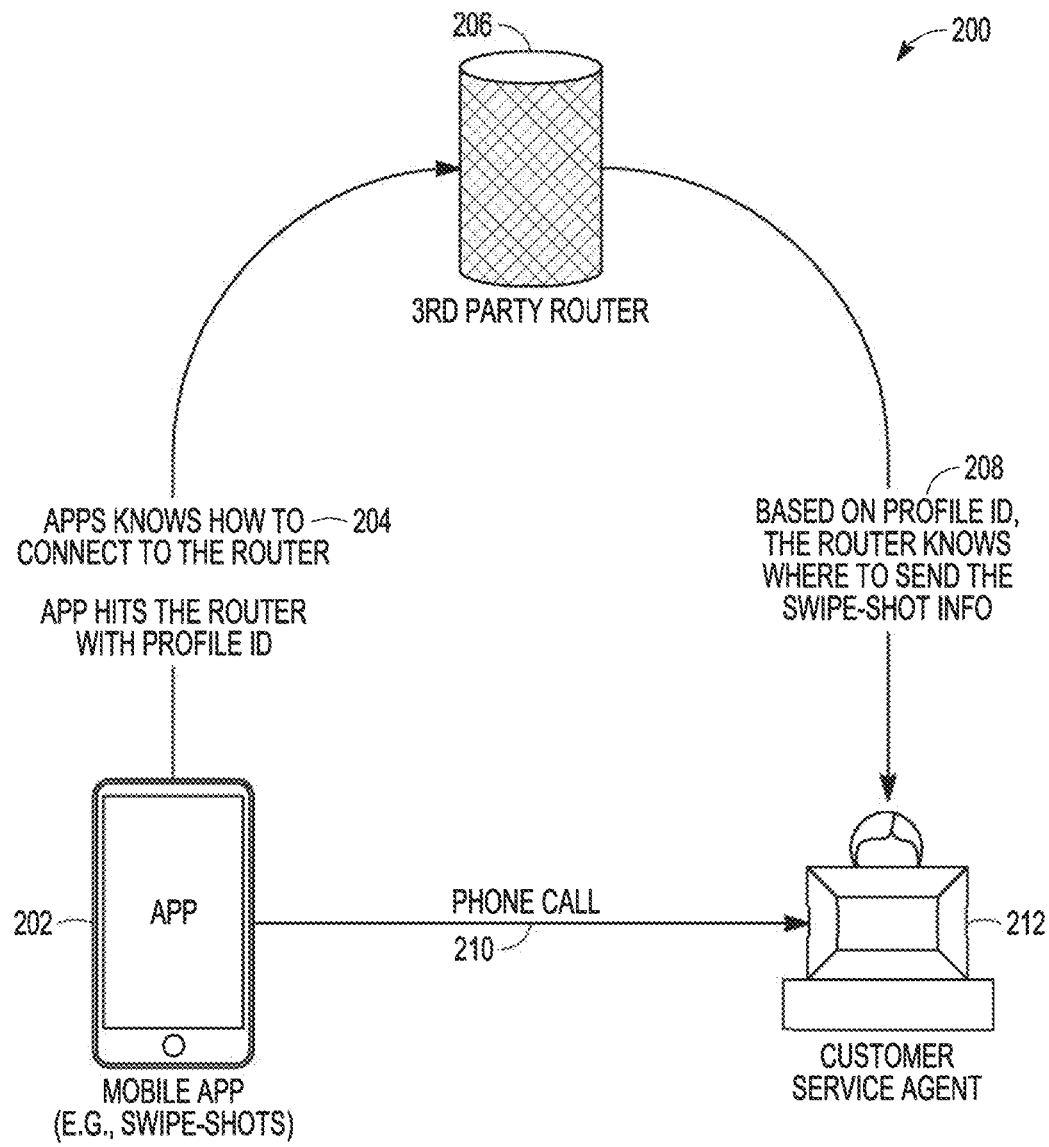
FIG. 2 is a flow diagram of a process for routing profile information to a customer service agent, in accordance with example embodiments.

FIG. 2 is a flow diagram of a process 200 for routing profile information from a mobile device 202 to a customer service agent 212. The process 200 can include placing a phone call 210 from the mobile device 202 to the customer service agent 212. As shown, the mobile device 202 can have a mobile app installed on it. The mobile app can store one or more profiles locally on the mobile device 202, where each of the profiles has a unique profile ID 204. In the example of FIG. 2, in addition to a profile ID 204 for each local profile, the mobile app also stores information needed to connect to a third party router 206. The app can be installed by a user of the mobile device 202 and then the user can register the app with the third party router 206. In some embodiments, the registration process includes sending a profile ID 204 from the mobile device 202 to the third party router 206.

After the mobile app has been installed and registered, the user of the mobile device 202 can place a phone call 210 to the customer service agent 212. In certain embodiments, the phone call 210 can be a voice call. In additional or alternative embodiments, the phone call 210 can be a video call placed via a video communications product, a videoconferencing product, or a video telephony tool, such as, for example, Skype™ developed by Skype Technologies, Zoom Video Conferencing developed by Zoom Video Communications, Inc., and FaceTime developed by Apple Inc. During the phone call 210 between the mobile device 202 and the customer service agent 212, the mobile app can send a profile ID 204 and selected data fields from the corresponding profile to the third party router 206. A user of the mobile device 202 can interact with user interface action elements presented in an interactive user interface of the mobile app to select data fields from a profile that the user wishes to send to the customer service agent 212.

In the embodiment shown in FIG. 2, the mobile device 202 is a smartphone with a touch screen and the mobile app is a swipe shots application that accepts swipe inputs to select data fields from the profile that are to be sent to the customer service agent 212. For example, responsive to user swipe inputs on user interface action elements presented in an interactive user interface on the mobile device 202, corresponding data fields (e.g., swipe-shot information) from the user's profile can be sent to the customer service agent 212 via the third party router 206.

As illustrated in FIG. 2, the third party router 206 can receive the profile ID 204 along with profile data (e.g., swipe-shot information) from the mobile device 202. Based on the received profile ID 204, the third party router 206 can then perform transmission and routing 208 to send the profile information to the customer service agent 212. In the embodiment shown in FIG. 2, this transmission and routing 208 of profile information from the mobile device 202 to the customer service agent 212 (via the third party router 206) can be performed during an ongoing call 210 between a user of the mobile device 202 the customer service agent 212. In this way, the user's profile information can be stored locally on the user's mobile device 202, and selectively shared with the customer service agent 212 in a timely manner without requiring the user to store the profile information at the third party router 206.

FIG. 3 is a block diagram illustrating an example system 300 for automatically building an electronic profile 308. After registering a profile application on a user's device, the system 300 can be used to build an electronic profile 308 and then import 310 the profile into the profile application.

In the system 300, a service provider can send a welcome email 302 to a user when the user sets up an account with the service provider. As illustrated in FIG. 3, the welcome email 302 can include a QR code 304 or manual key 306 that enables the user to automatically import 310 a pre-built electronic profile 308 into the user's profile application. The QR code 304 or manual key 306 can be used to build the electronic profile 308, where the electronic profile 308 has data fields of interest to the service provider. In some embodiments, data fields of the electronic profile 308 can be populated from a default, generic profile for the user. For example, the electronic profile 308 can be populated with the user's name, contact information (e.g., email addresses and phone numbers), a billing address, and a shipping address. In some embodiments, the generic profile can be populated with data field values retrieved from a cloud-based service or a local data store on the user's device. Based on the QR code 304 or manual key 306, the electronic profile 308 can also be populated with an account number for an account the user has opened with the service provider. In certain embodiments, the generic profile is stored on the user's client device and once built, the electronic profile 308 is imported 310 into the profile application installed on the client device.

As shown, after the electronic profile 308 is built and imported 310 into the user's profile application, it can be stored locally on the user's client device (e.g., mobile device 202 with a mobile profile management app or desktop computing device 312 with a desktop profile management application). In the examples shown in FIG. 3, the profile application can be installed on a mobile device 202, a desktop computing device 312, or implemented as a web-based application, also known as a web application or web app, or a browser extension 314. In the browser extension 314 example, the electronic profile 308 can be accessed by using a browser to navigate to a website. In additional or alternative embodiments, the electronic profile 308 can be accessed by a mobile profile app installed on the mobile device 202 or by a desktop profile application installed on the desktop computing device 312.

Figure 4:
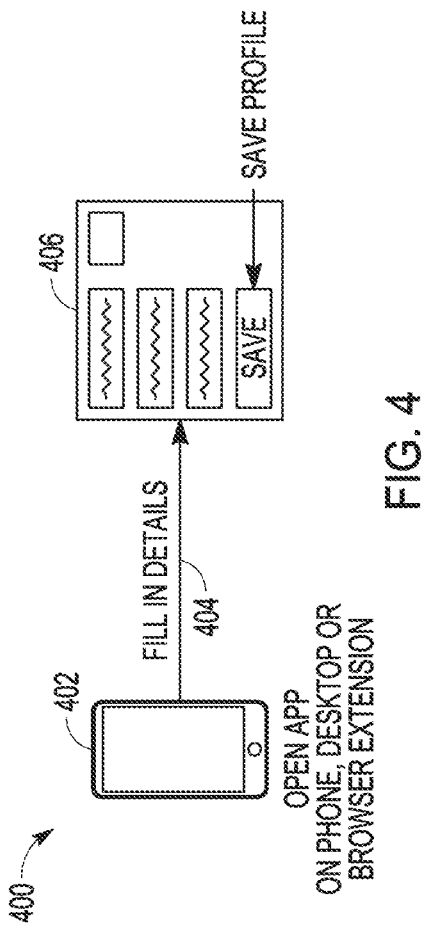
FIG. 4 is a block diagram illustrating an example system for populating and storing an electronic profile, according to certain example embodiments.

FIG. 4 is a block diagram illustrating an example system 400 for populating and storing an electronic profile 406. In some embodiments, a profile application installed on a user client device 402 can be used to manually build the electronic profile 406. As shown, the profile application can be installed on the user client device 402, which can be a mobile device or a desktop computing device. In an additional or alternative embodiment, the electronic profile 406 can be populated 404 using a web-based application or a browser extension. For example, instead of using a mobile profile app or a desktop profile application, the user can navigate to a web-based form using a browser with a browser extension (e.g., a browser plug-in) that extends the functionality of the browser so that it can be used to populate data fields of the electronic profile 406.

As shown, a user of the system 400 can populate 404 the electronic profile 406 by filling in details for data fields. After the electronic profile 406 has been populated 404, the electronic profile 406 can be saved and stored locally on the user client device 402.

FIGS. 5 and 6 illustrate interactive user interfaces, according to embodiments of the present disclosure. In particular, FIGS. 5 and 6 illustrate exemplary embodiments of interactive user interfaces for a profile application on a mobile device. The interactive user interfaces depicted in FIGS. 5 and 6 are described with reference to the embodiments of FIGS. 2-4. However, the interactive user interfaces are not limited to those example embodiments. In certain embodiments, the visual interfaces illustrated in FIGS. 5 and 6 are displayed on a mobile computing device, which can have a touch sensitive (i.e., touch screen) display device. For ease of explanation, the profile management operations discussed below with reference to FIGS. 5 and 6 are described in the context of a mobile profile app executing on a mobile device 202 with a touch-screen display device. However, the operations are not intended to be limited to the exemplary device shown in FIGS. 5 and 6. It is to be understood that the user interfaces illustrated in the exemplary embodiments of FIGS. 5 and 6 can be readily adapted to be rendered on displays of a variety of computing device platforms running a variety of operating systems.

Throughout FIGS. 5 and 6, displays are shown with various interface action elements, icons, links, command regions, and buttons that are used to initiate action, invoke routines, manage profiles, import new profiles, select profile fields, or invoke other functionality. The initiated actions include, but are not limited to, accessing a user profile, displaying a profile associated with a service provider, selecting one or more profile data fields to share with a customer service agent, managing a profile, importing a new profile, placing a call (e.g., to a customer service agent), and other inputs and gestures. For brevity, only the differences occurring within the figures, as compared to previous or subsequent ones of the figures, are described below. FIG. 5 illustrates an example interactive user interface 500 for managing and importing electronic profiles on a user device (e.g., a mobile device). In the example of FIG. 5, the interactive user interface 500 is the interface of a profile application executing on a mobile device. The interactive user interface 500 includes profile access buttons 502 for accessing and interacting with profiles associated with service providers. As shown, respective ones of the profile access buttons 502 can be used to access a user's profile associated with financial service providers such as banks and online shopping sites and e-commerce entities such as eBay and Amazon. The profile access buttons 502 each include respective names identifying different service providers.

The interactive user interface 500 also includes a profile management button 504 that can be selected to manage a selected electronic profile. According to an embodiment, the profile management button 504 can be used to invoke the profile populating and profile storing functionalities of the system 400 described above with reference to FIG. 4.

In an embodiment, selection of the profile management button 504 can cause the profile application to display the interactive profile view interface 600 shown in FIG. 6, which is discussed below. The interactive user interface 500 further includes a profile import button 506 that can be selected to import a new electronic profile. In one embodiment, the profile import button 506 can be used to invoke the profile building and profile importing functionalities of the system 300 described above with reference to FIG. 3.

As shown in FIG. 5, the interactive user interface 500 additionally includes a call interface 508 that can be used to place a call to a customer service agent. For instance, the call interface 508 can be used to place a voice call to a customer service agent associated with a service provider. In some embodiments, one or more of the profile access buttons 502, profile management button 504, and profile import button 506 can be selected during an ongoing call with a customer service agent that has been placed using the call interface 508.

FIG. 6 illustrates an example interactive profile view interface 600 for viewing and selecting profile data fields to be provided to a requester (e.g., a customer service agent). As shown, the interactive profile view interface 600 includes a plurality (array) of user interface action elements 602, where each of the plurality of user interface action elements 602 are associated with a data field of an electronic profile. In certain embodiments, the data fields of the electronic profile can be stored in a data structure locally on a mobile device that displays the interactive profile view interface 600.

In the example of FIG. 6, each of the user interface action elements 602 includes a slide-able element 604 that can be selected in order to send the corresponding data field to a requester. In certain embodiments, the slide-able element 604 can be slid (e.g., swiped) to send a profile data field to a customer service agent while the user of the interactive profile view interface 600 is on a call with the customer service agent. In some embodiments, selected ones of the user interface action elements 602 can be tagged by the customer service agent, where the tagging causes the interactive profile view interface 600 to prompt the user to slide associated slide-able elements 604 in order to send the corresponding data fields to the customer service agent.

The interactive profile view interface 600 can include a navigable array or list of user interface action elements 602. As depicted in FIG. 6, a scroll bar 606 can be used to navigate to user interface action elements 602 corresponding to data fields of an electronic profile. That is, the interactive profile view interface 600 can be a scrollable list or table of interactive user interface action elements 602 corresponding to data fields of a user's profile with a selected service provider. FIG. 6 also illustrates that the interactive profile view interface 600 can include an edit button 608. The edit button 608 can be used to edit a selected data field of the user's profile.

Figure 7:
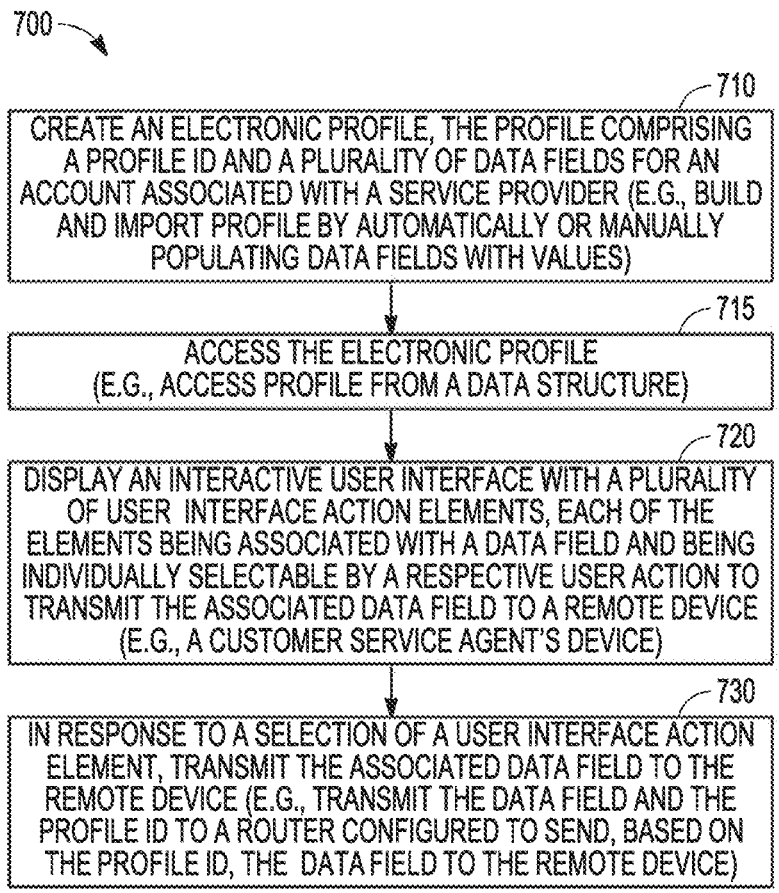
FIG. 7 illustrates a method for providing profile information to a customer service agent, in accordance with example embodiments.

FIG. 7 illustrates a method 700 for providing profile information to a requestor such as, for example, a customer service agent associated with a service provider.

At operation 710, an electronic profile can be created. In the example of FIG. 7, operation 710 includes creating an electronic profile that comprises data fields for an account associated with a service provider. Operation 710 can be used to create separate profiles for a user's accounts with multiple service providers. The service providers can include financial institutions such as banks, credit unions, and credit card issuers, government agencies such as a state DMV, utilities such as an electric power utility, medical providers such as doctor's offices, dentists, and health insurance companies, wireless telecommunications service providers, ISPs, cable and satellite television providers, retailers, and online shopping entities such as eBay and Amazon.

As shown, operation 710 can include building and importing the electronic profile. Operation 710 can include populating data fields of the electronic profile with values. In the example of FIG. 7, operation 710 can be performed automatically or manually. For instance, operation 710 can include performing the automatic profile building and importing operations of the system 300 described above with reference to FIG. 3. In additional or alternative embodiments, operation 710 can include performing the manual profile building and storing operations of the system 400 described above with reference to FIG. 4.

At operation 715, the electronic profile is accessed. As shown, operation 715 can include accessing the electronic profile from a data structure such as a local data store on a mobile client device (e.g., a smartphone).

At operation 720, an interactive user interface is displayed. The interface can be displayed on a display device such as a touch-sensitive display of a mobile client device. As shown, the interface can include a plurality of user interface action elements. Each of the plurality of user interface action elements can be associated with a data field in the data structure storing the profile. Each of the plurality of user interface action elements is also individually selectable by a respective user action to transmit the associated data field to a remote device.

At operation 730, in response to receiving a selection of a user interface action element, the associated data field is transmitted to the remote device. As shown, operation 730 can include transmitting the associated data field and the profile ID to a router that is configured to send, based on the profile ID, the associated data field to the remote device.

Figure 8:
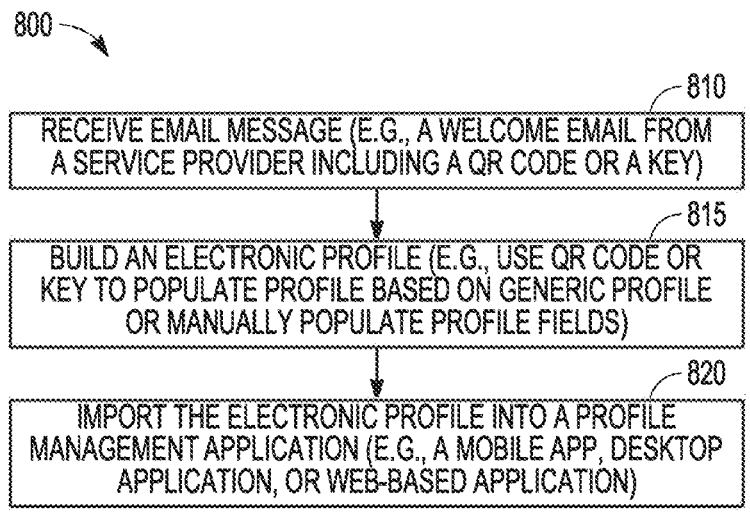
FIG. 8 illustrates a method for importing an electronic profile into a user application, in accordance with example embodiments.

FIG. 8 illustrates a method 800 for building and importing an electronic profile into a profile application.

At operation 810, an email message including a QR code or a manual key is received. Operation 810 can include receiving welcome email 302 with QR code 304 or manual key 306 as described above with reference to FIG. 3. In certain embodiments, the email message can be a welcome email sent from a service provider to a user that has opened an account with the service provider.

At operation 815, an electronic profile is built. Operation 815 can include using the QR code or key included in the email to populate the electronic profile with data from a default, generic profile. In this way, operation 815 automatically builds the electronic profile. In an alternative or additional embodiment, operation 815 can include using an interactive user interface to manually populate data fields of the electronic profile.

At operation 820, the electronic profile is imported into a profile management application. As shown, operation 820 can include importing the profile into a mobile profile management app, a desktop profile management application, or a web-based profile management application. In certain embodiments, operation 820 can include performing import 310 of the electronic profile 308 as described above with reference to FIG. 3

Example System

Figure 9:
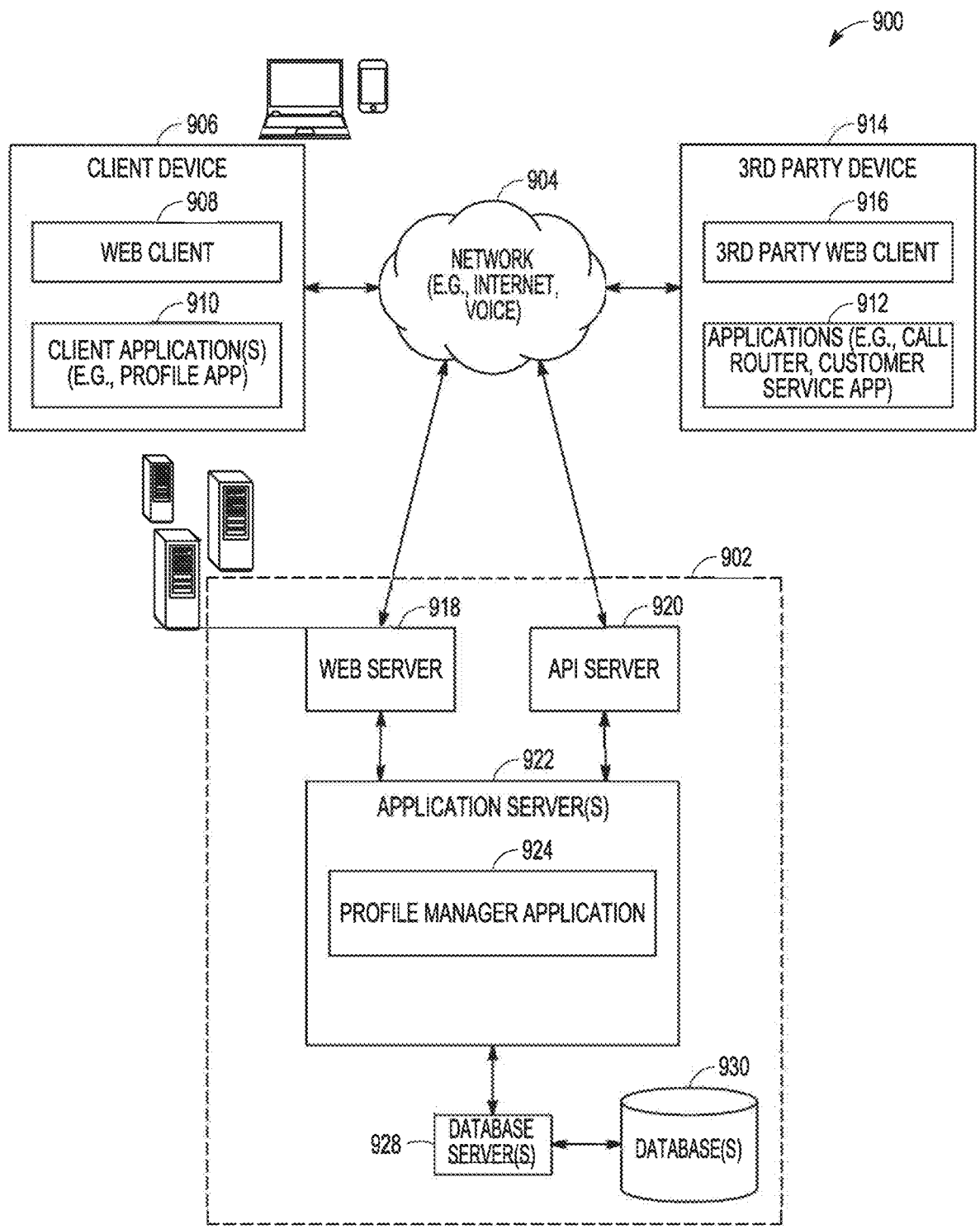
FIG. 9 is a network diagram depicting a client-server system, within which one example embodiment of a profile manager may be deployed, in accordance with example embodiments.

FIG. 9 is a network diagram depicting a client-server system 900, within which one example embodiment of a profile manager may be deployed. A networked system 902, in the example forms of a network-based marketplace or publication system, provides server-side functionality, via a network 904 (e.g., the Internet or a wide area network (WAN)) to one or more clients. FIG. 9 illustrates, for example, a web client 908 (e.g., a browser, such as the Internet Explorer browser developed by Microsoft Corporation, the Google Chrome browser developed by Google Inc., or the Safari browser developed by Apple Inc.) and a client application(s) 910 executing on a client device 906. It is understood that the client device(s) 906 may be a mobile computing device (e.g., a smartphone), a personal computer (PC), a laptop computer, a set-top box (STB), a Personal Digital Assistant (PDA), a web appliance, a network router, switch or bridge, a tablet computer, a wearable computing device (e.g., a smart watch), an Internet of things (IoT) device, a computing device embedded in clothing or an accessory, or any machine capable of executing a set of instructions (sequential or otherwise) that specify actions to be taken by that machine. Further, while only a single device is illustrated, the terms "device" and "machine" shall also be taken to include any collection of devices (or machines) that individually or jointly execute a set (or multiple sets) of instructions to perform any one or more of the methodologies discussed herein.

FIG. 9 also illustrates, for example, a 3rd party device(s) 914 that executes a web client 916 and an application(s) 912. In some embodiments, a 3rd party can be a customer service agent for a transaction entity (such as a retailer) processing a transaction with an account associated with the client device 906. It is understood that the 3rd party device can be (but is not limited to) a customer service agent's computing device, a point-of-sale device, a handheld wireless mobile devices, a server(s), a sensor(s) (such as beacons, e.g., Bluetooth or RF-enabled sensors), a WiFi-enabled device, a camera, and/or a scanner (e.g., barcode scanners). In additional embodiments, another third Party Device 914 (not shown) can function as the third party provider 106 of FIG. 1 or the third party router 206 of FIG. 2.

An Application Program Interface (API) server 920 and a web server 918 are coupled to, and provide programmatic and web interfaces respectively to, an application server(s) 922. The application server 922 hosts a profile manager application 924. While the user's electronic profiles can be stored locally on the client device 906 and locally populated using client application 910, the profile manager application 924 can store profile identifiers (profile IDs) and information needed to send profile information from the client device 906 to a customer service agent. The application server 922 is, in turn, shown to be coupled to a database server(s) 928 that facilitates access to a database(s) 930. In some embodiments, the client device 906 and the 3rd party device 914 may access the profile manager application 924 via a web server 918.

The profile manager application 924 may provide a number of profile management functions and services to accounts and transaction entities (such as retailers) that access the networked system 902. While the profile manager application 924 is shown in FIG. 9 to form part of the networked system 902, it will be appreciated that, in alternative embodiments, the profile manager application 924 may form part of a system or service, such as a payment service, that is separate and distinct from the networked system 902.

Further, while the system 900 shown in FIG. 9 employs a client-server architecture, the present disclosure is of course not limited to such an architecture, and could equally well find application in a distributed, or peer-to-peer, architecture system, for example. Any portion, or portions, of the profile manager application 924 may reside and be executed from a client device, such as a wireless mobile device, or a point-of-sale device. The profile manager application 924 could also be implemented as standalone software program (s), which does not necessarily have networking capabilities.

The actual number of servers used to implement the client application 910 and the profile manager application 924 and how features are allocated among them will vary from one implementation to another, and may depend in part on the amount of profile data traffic that the system 900 handles during peak usage periods as well as during average usage periods.

Moreover, one or more of the methodologies described herein may facilitate the visualization of an interactive profile management interface and providing profile information using the profile manager application 924.

When these effects are considered in aggregate, one or more of the methodologies described herein may obviate a need for certain efforts or resources that otherwise would be involved in managing user profiles. Efforts expended by a user in creating and managing electronic profiles may be reduced by one or more of the methodologies described herein. Computing resources used by one or more machines, databases, or devices (e.g., within the system 900) may similarly be reduced. Examples of such computing resources include processor cycles, network traffic, memory usage, data storage capacity, power consumption, and cooling capacity.

Example Mobile Device

Figure 10:
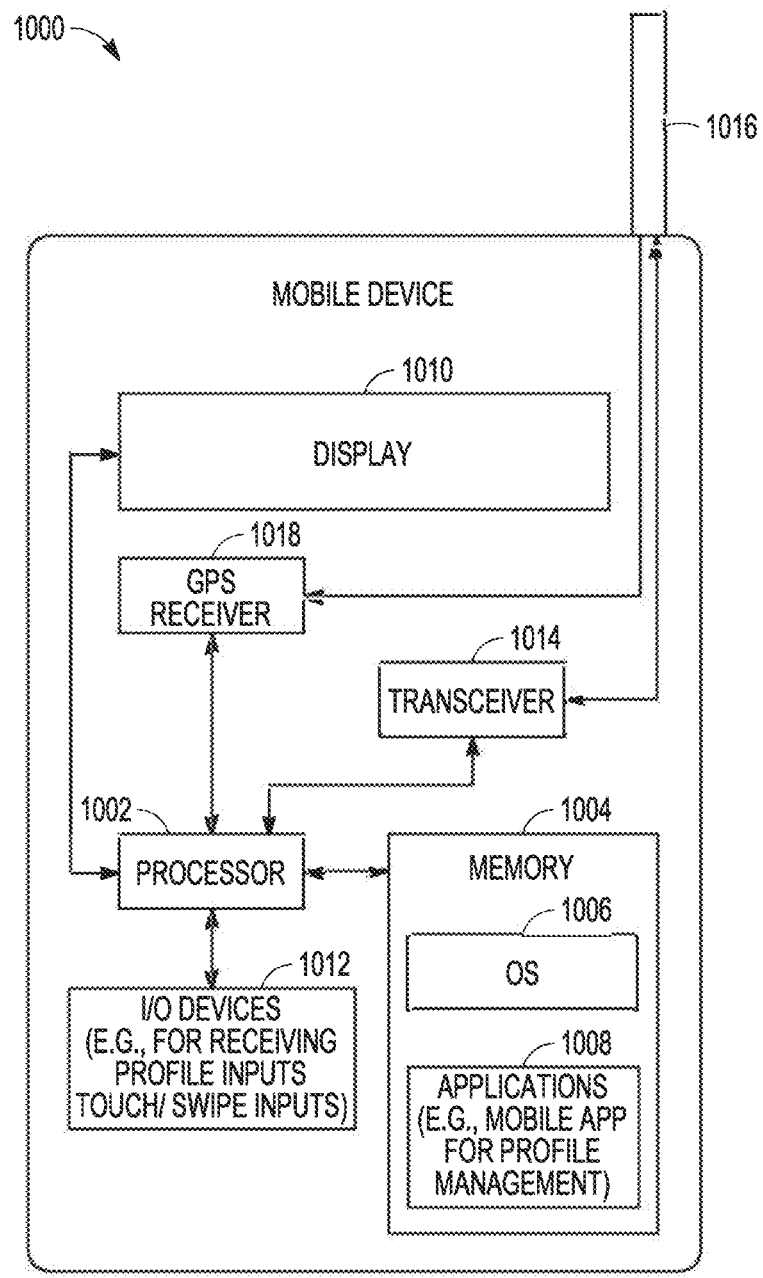
FIG. 10 is a block diagram illustrating a mobile client device on which a mobile profile management application described herein can be executed, in accordance with example embodiments.

FIG. 10 is a block diagram illustrating a mobile device 1000, according to some example embodiments. The mobile device 1000 can include a processor 1002. The processor 1002 can be any of a variety of different types of commercially available processors suitable for mobile devices 1000 (for example, an XScale architecture microprocessor, a Microprocessor without Interlocked Pipeline Stages (MIPS) architecture processor, or another type of processor). A memory 1004, such as a random access memory (RAM), a Flash memory, or other type of memory, is typically accessible to the processor 1002. The memory 1004 can be adapted to store an operating system (OS) 1006, as well as application programs 1008, such as a mobile location-enabled application that can provide location-based services to a user. The processor 1002 can be coupled, either directly or via appropriate intermediary hardware, to a display 1010 and to one or more I/O devices 1012, such as a keypad, a touch panel sensor, a microphone, and the like. Similarly, in some example embodiments, the processor 1002 can be coupled to a transceiver 1014 that interfaces with an antenna 1016. The transceiver 1014 can be configured to both transmit and receive cellular network signals, wireless data signals, or other types of signals via the antenna 1016, depending on the nature of the mobile device 1000. Further, in some configurations, a GPS receiver 1018 can also make use of the antenna 1016 to receive GPS signals.

Each of the above-identified elements may be stored in one or more of the previously mentioned memory devices, and corresponds to a set of instructions for performing a function described above. The above identified modules or programs (e.g., sets of instructions) need not be implemented as separate software programs, procedures, or modules, and thus various subsets of these modules may be combined or otherwise rearranged in various example embodiments. In some example embodiments, the memory 1004 may store a subset of the modules and data structures identified above. Furthermore, the memory 1004 may store additional modules and data structures not described above.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but also deployed across a number of machines. In some example embodiments, the processor or processors can be located in a single location (e.g., within a home environment, an office environment, or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 904 of FIG. 9) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine

Figure 11:
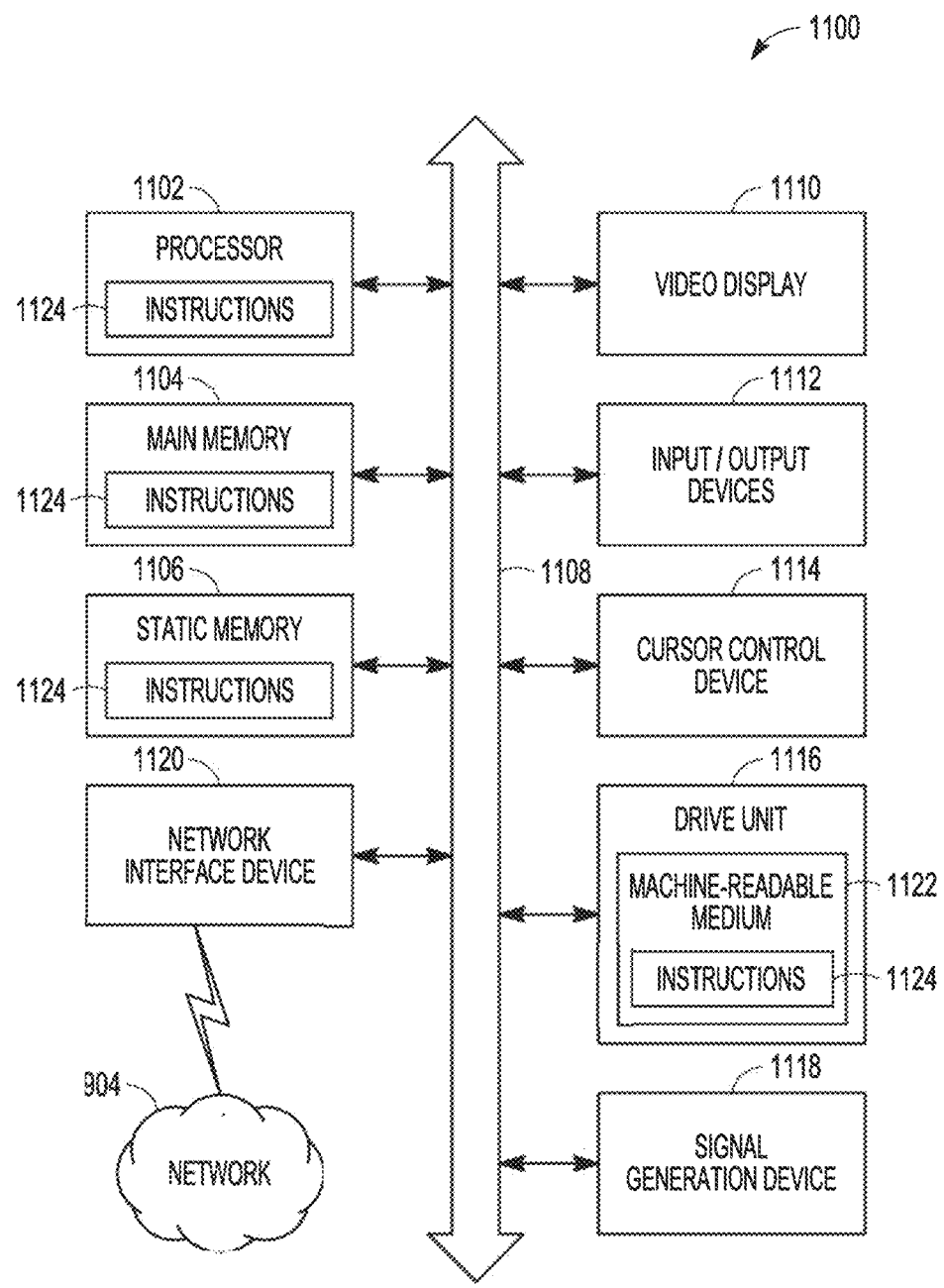
FIG. 11 is a block diagram illustrating components of a machine in the form of a computer system able to read instructions from a machine-readable medium and perform any one or more of the methodologies discussed herein, in accordance with example embodiments.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part. The client device 906, $3^{rd}$ party device 914, web server 918, and API server 920 can be examples of the machine 1100.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a PC, a tablet computer, a laptop computer, a netbook, a cellular telephone, a smartphone, a STB, a PDA, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein. The machine 1100 includes a processor 1102 (e.g., a central processing unit (CPU), a graphics processing unit (GPU), a digital signal processor (DSP), an ASIC, a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a video display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include I/O devices 1112 (e.g., a touch screen, a button, a keyboard, a keypad, a microphone, a camera, or other alphanumeric I/O device), a cursor control device 1114 (e.g., a mouse, a touchpad, a trackball, a stylus, a joystick, a motion sensor, a finger, an eye tracking device, or other pointing instrument), a drive unit 1116 (e.g., a storage device), a signal generation device 1118 (e.g., a sound card, an amplifier, a speaker, a headphone jack, or any suitable audio generation device), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 904 via the network interface device 1120. For example, the network interface device 1120 may communicate the instructions 1124 using any one or more transfer protocols (e.g., hypertext transfer protocol (HTTP)).

The machine-readable medium 1122 may include a magnetic or optical disk storage device, solid-state storage devices such as flash memory, or other non-volatile memory device or devices. The computer-readable instructions 1124 stored on the machine-readable medium 1122 are in source code, assembly language code, object code, or another instruction format that is interpreted by one or more processors (e.g., processor 1102).

In some example embodiments, the machine 1100 may be a portable computing device, such as a smartphone (see, e.g., the mobile device 1000 shown in FIG. 10) or tablet computer, and have one or more additional I/O devices 1112 (e.g., touch pads, touch screens, sensors, or gauges). Examples of such I/O devices 1112 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these I/O devices 1112 may be accessible and available for use by any of the modules described herein.

As used herein, the term "memory" refers to a machine-readable medium able to store data temporarily or permanently and may be taken to include, but not be limited to, RAM, read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium, or combination of multiple media, that is capable of storing the instructions 1124 for execution by the machine 1100, such that the instructions 1124, when executed by one or more processors of the machine 1100

(e.g., the processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1124 can further be transmitted or received over a communications network 904 using a transmission medium. The instructions 1124 can be transmitted using the network interface device 1120 and any one of a number of well-known transfer protocols (e.g., HTTP). Examples of communication networks include a local area network (LAN), a WAN, the Internet, mobile telephone networks, plain old telephone service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A watch comprising:
   a touch-sensitive display interface; and
   an application implemented at the watch to:
      cause display, via the touch-sensitive display interface of the watch, of a data field that includes information; and
      responsive to a swiping gesture across the display of the data field, send a message with the information displayed in the data field from the watch to a service provider.

2. The watch of claim 1, wherein the application is further configured to:
   cause display, via the touch-sensitive display interface of the watch, of an additional data field that includes additional information; and
   send an additional message with the additional information responsive to receipt, by the watch, of a voice input.

3. The watch of claim 1, wherein the application is further configured to:
   cause display, via the touch-sensitive display interface of the watch, of an additional data field that includes additional information; and
   responsive to a tapping gesture in relation to the display of the additional data field, send an additional message with the additional information displayed in the data field.

4. The watch of claim 1, wherein the application is further configured to:
   cause display, via the touch-sensitive display interface of the watch, of an additional data field that includes additional information; and
   responsive to a pressing gesture in relation to the display of the additional data field, send an additional message with the additional information displayed in the data field.

5. The watch of claim 1, wherein the application is further configured to:
   cause display, via the touch-sensitive display interface of the watch, of an additional data field that includes additional information; and
   send an additional message with the additional information responsive to receipt, by the watch, of a visual input.

6. The watch of claim 1, wherein the message is a text message.

7. The watch of claim 1, wherein the message is a Short Messaging Service (SMS) text message.

8. The watch of claim 1, wherein the message is sent using a messaging protocol.

9. The watch of claim 1, wherein the service provider is configured to further transfer the message with the information to an additional user.

10. The watch of claim 9, wherein the additional user is a customer service agent.

11. The watch of claim 1, wherein the swiping gesture is a left swiping gesture across the display of the data field.

12. The watch of claim 1, wherein the application is further implemented at the watch to cause display of a slide-able user interface action element in association with the display of the data field, and the slide-able user interface action element including a prompt to swipe left to send the message.

13. The watch of claim 1, wherein the application is further implemented at the watch to cause display of a slide-able user interface action element in association with the display of the data field, and to cause the slide-able user interface action element to slide across the touch-sensitive display interface responsive to the swiping gesture.

14. A method comprising:
displaying, via a touch-sensitive display interface of a watch, a data field that includes information; and
responsive to a swiping gesture input across display of the data field, sending a message with the information displayed in the data field from the watch to a service provider.

15. The method of claim 14, wherein the swiping gesture input is a left swiping gesture across the display of the data field.

16. The method of claim 14, further comprising:
displaying, via the touch-sensitive display interface of the watch, an additional data field that includes additional information; and
sending an additional message with the additional information responsive to receipt, by the watch, of a voice input.

17. The method of claim 14, further comprising:
displaying, via the touch-sensitive display interface of the watch, an additional data field that includes additional information; and
sending an additional message with the additional information responsive to receipt, by the watch, of a visual input.

18. The method of claim 14, wherein the information comprises profile information of a user profile.

19. The method of claim 18, wherein the profile information comprises at least one of:
a name of a user corresponding to the user profile;
an address of the user;
an identifier of the user;
customer care information included in the user profile; or
a security question.

20. One or more computer-readable storage media storing instructions that are executable by one or more processors to perform operations including:
displaying, via a touch-sensitive display interface of a watch, a data field that includes information; and
responsive to a swiping gesture input across display of the data field, sending a message with the information displayed in the data field from the watch to a service provider.

* * * * *